(12) United States Patent
Jiang et al.

(10) Patent No.: US 9,713,053 B2
(45) Date of Patent: Jul. 18, 2017

(54) NETWORK TRAFFIC REDIRECTION (NTR) IN LONG TERM EVOLUTION (LTE)

(75) Inventors: John Yue Jun Jiang, Danville, CA (US); David Gillot, Brussels (BE); Juan Hurtado, Madrid (ES)

(73) Assignee: MOBILEUM, INC., Cupertino, CA (US)

(*) Notice: Subject to any disclaimer, the term of this patent is extended or adjusted under 35 U.S.C. 154(b) by 0 days.

(21) Appl. No.: 14/130,876

(22) PCT Filed: Jul. 6, 2012

(86) PCT No.: PCT/US2012/045780
§ 371 (c)(1),
(2), (4) Date: Sep. 11, 2014

(87) PCT Pub. No.: WO2013/006805
PCT Pub. Date: Jan. 10, 2013

(65) Prior Publication Data
US 2014/0378129 A1 Dec. 25, 2014

Related U.S. Application Data

(60) Provisional application No. 61/504,977, filed on Jul. 6, 2011.

(51) Int. Cl.
*H04W 4/00* (2009.01)
*H04W 36/14* (2009.01)
(Continued)

(52) U.S. Cl.
CPC .............. *H04W 36/14* (2013.01); *H04W 8/02* (2013.01); *H04W 60/00* (2013.01); *H04W 60/04* (2013.01); *H04W 8/12* (2013.01)

(58) Field of Classification Search
CPC ........................................................ H04W 8/12
(Continued)

(56) References Cited

U.S. PATENT DOCUMENTS

| | | | |
|---|---|---|---|
| 6,751,464 B1 * | 6/2004 | Burg | G08G 1/096716 370/331 |
| 2007/0173252 A1 * | 7/2007 | Jiang | H04W 8/04 455/432.1 |

(Continued)

FOREIGN PATENT DOCUMENTS

| | | |
|---|---|---|
| EP | 1 463 366 A2 | 9/2004 |
| EP | 2 271 033 A1 | 1/2011 |
| WO | WO 2004/014101 A2 | 2/2004 |

OTHER PUBLICATIONS

Supplementary European Search Report mailed Apr. 23, 2015 for corresponding European Patent Application No. 12807136.2.

(Continued)

*Primary Examiner* — Sam K Ahn
*Assistant Examiner* — Fabricio R Murillo Garcia
(74) *Attorney, Agent, or Firm* — Arent Fox LLP

(57) ABSTRACT

The present invention is directed towards methods and systems for redirecting roaming network traffic in an LTE network. The methods include observing a registration process of a subscriber in a visited network. The methods further include, upon successful registration, sending one or more messages to the visited network to induce a re-registration attempt by the subscriber to another visited network.

16 Claims, 5 Drawing Sheets

(51) Int. Cl.
*H04W 60/04* (2009.01)
*H04W 8/02* (2009.01)
*H04W 60/00* (2009.01)
*H04W 8/12* (2009.01)

(58) Field of Classification Search
USPC ...................................................... 455/432.1
See application file for complete search history.

(56) References Cited

U.S. PATENT DOCUMENTS

| | | | |
|---|---|---|---|
| 2007/0184825 A1* | 8/2007 | Lim ........................ | H04W 8/06 455/422.1 |
| 2008/0020756 A1 | 1/2008 | Jiang | |
| 2009/0258631 A1 | 10/2009 | Forsberg et al. | |
| 2010/0234022 A1* | 9/2010 | Winterbottom ......... | H04W 4/02 455/433 |
| 2011/0086628 A1* | 4/2011 | Karuturi .............. | H04Q 3/0029 455/418 |
| 2011/0149853 A1 | 6/2011 | Olsson et al. | |
| 2012/0207015 A1* | 8/2012 | Marsico .............. | H04L 41/0663 370/221 |
| 2014/0274045 A1* | 9/2014 | Yu ........................ | H04W 48/16 455/434 |

OTHER PUBLICATIONS

International Search Report, International Application No. PCT/US2012/045780 mailing date Sep. 28, 2012.
European Office Action of related European Patent Application No. 12807136.2 dated Apr. 6, 2017.

\* cited by examiner

NETWORK TRAFFIC REDIRECTION (NTR) IN LONG TERM EVOLUTION (LTE)

CROSS-REFERENCED TO RELATED APPLICATIONS

This application is a National Stage entry of International Application PCT/US2012/045780 filed Jul. 6, 2012, which claims priority to U.S. Provisional Patent Application No. 61/504,977, filed Jul. 6, 2011, the disclosures of each of these prior applications being hereby incorporated in their entirety by reference.

FIELD OF THE INVENTION

The present invention generally relates to telecommunication. More specifically, the invention relates to method and system for redirecting roaming traffic to preferred operators across multiple telecommunication networks.

BACKGROUND OF THE INVENTION

As telecommunication technology has progressed, numerous mobile communication standards have been developed. These standards are broadly categorized into second generation (2G), third generation (3G) and the future, fourth generation (4G) technologies. Examples of 2G/3G technologies include Global System for Mobile communications (GSM), General Packet Radio Service (GPRS), Enhanced Data rates for GSM Evolution (EDGE), Universal Mobile Telecommunications System (UMTS), and the like. The UMTS standard further evolved to LTE technology under the Third Generation Partnership Project (3GPP). LTE technology offers a wireless broadband system with higher data rates, lower latency, and higher spectrum efficiency.

To keep up with the competition, more and more operators are adapting the newer LTE technology standard. These network operators provide voice and data services to their own subscribers and to subscribers from other networks. When the network operator provides service to a subscriber from a foreign country, it is referred to as "international roaming". When the network operator provides service to a subscriber from another network in the same country, it is referred to as "domestic roaming".

An operator always has a preference for one or more operators over another set of operators. Various network operators have partnership agreements with each other that include more favorable roaming charges than non-partners receive. Partner networks are "preferred" networks for the network operator's subscriber to register with when roaming. Non-partner networks are "non-preferred" networks to the subscriber. Network operators can maximize their margins and the roamers can get more attractive roaming rates and services if roamers roam on their home mobile operator's preferred partner networks.

Over the last few years, the revenues to network operators from home subscribers have consistently declined due to increased competition and resulting pricing pressures. On the other hand, revenues from roamers have consistently grown in the same period due to increased mobile penetration in local markets and an increase in travel. Hence, protecting the existing roaming revenues and growing them further has become an important priority for the network operators worldwide.

Some operators also own networks in various countries. These operators would like to make sure their out-roamers stay within the group properties, or stay on preferred networks, in order to gain the best service experience even when roaming. They will also be able to offer geography based price plans (for example, a single rate all across Western Europe or South East Asia) to users who have subscribed to such plans. In addition, as new technologies like LTE keep rolling out, operators can control the rollout schedule across their own properties and also make sure interoperability issues are taken care of. Keeping roaming subscribers on preferred networks gives the best service experience to the subscriber. However, current methods of controlling which network a subscriber registers on when roaming have disadvantages.

One previous patent from the inventors of this application was directed towards a method and system for facilitating redirection of network traffic towards a preferred network. However, that patent was focusing on GSM network. Considering the current scenario where LTE is widely getting adapted, there is a need in the art for a system and method facilitating redirection of network traffic across multiple networks including LTE and GSM.

SUMMARY

The present invention is directed towards a method and system for redirecting roaming network traffic in an LTE network. The method includes observing a registration process of a subscriber in a visited network. The method further includes upon successful registration, sending one or more messages to the visited network to induce a re-registration attempt by the subscriber to another visited network. The present invention in another embodiment also provides a method for redirecting roaming network traffic in an LTE network. The method includes intercepting a Diameter registration request of a subscriber in a visited network. The method further includes sending a Diameter Update Location Answer (Reject) message to the visited network, where the Diameter Update Location Answer (Reject) message results in an error code.

The present invention in another embodiment also provides a method for redirecting roaming network traffic in one or more telecommunication networks. The method includes observing a registration process of a subscriber in a visited network. The method further includes identifying the subscriber's registration on at least one of an LTE network or a GSM network. In case the subscriber is registered at the GSM network, then the it is identified whether the registration is due to loss of LTE coverage or CSFB. If registration is due to loss of LTE coverage, then the method includes sending one or more messages to the visited network to induce a re-registration attempt by the subscriber to another visited network.

The present invention in another embodiment also provides a system for redirecting roaming network traffic in a telecommunication network. The system includes an NTR module that observes a registration process of a subscriber in a visited network. The NTR module further sends one or more messages to the visited network to induce a re-registration attempt by the subscriber to another visited network.

In accordance with various embodiments of the present invention, the NTR module is capable of steering roamers across LTE and non-LTE (GSM) networks. This solution of implementing NTR is hereinafter, interchangeably, referred to as NTR LTE or NTR solution.

BRIEF DESCRIPTION OF DRAWINGS

In the drawings, the same or similar reference numbers identify similar elements or acts.

DETAILED DESCRIPTION

In the following description, for purposes of explanation, specific numbers, materials and configurations are set forth in order to provide a thorough understanding of the present invention. It will be apparent, however, to one having ordinary skill in the art that the present invention may be practiced without these specific details. In some instances, well-known features may be omitted or simplified, so as not to obscure the present invention. Furthermore, reference in the specification to "one embodiment" or "an embodiment" means that a particular feature, structure or characteristic, described in connection with the embodiment, is included in at least one embodiment of the present invention. The appearance of the phrase "in an embodiment", in various places in the specification, does not necessarily refer to the same embodiment.

The present invention provides a system and a method for redirecting roaming traffic across multiple telecommunication networks. The general idea of this invention is to allow an operator to apply NTR solution across LTE and non-LTE (GSM) networks. The HPMN operator deploys an NTR module to implement the solution as described in the present invention. This module enables the operator to steer away its subscribers from a non-preferred VPMN to a preferred VPMN. The preferred VPMN may be another LTE network or a GSM network.

Figure 1:
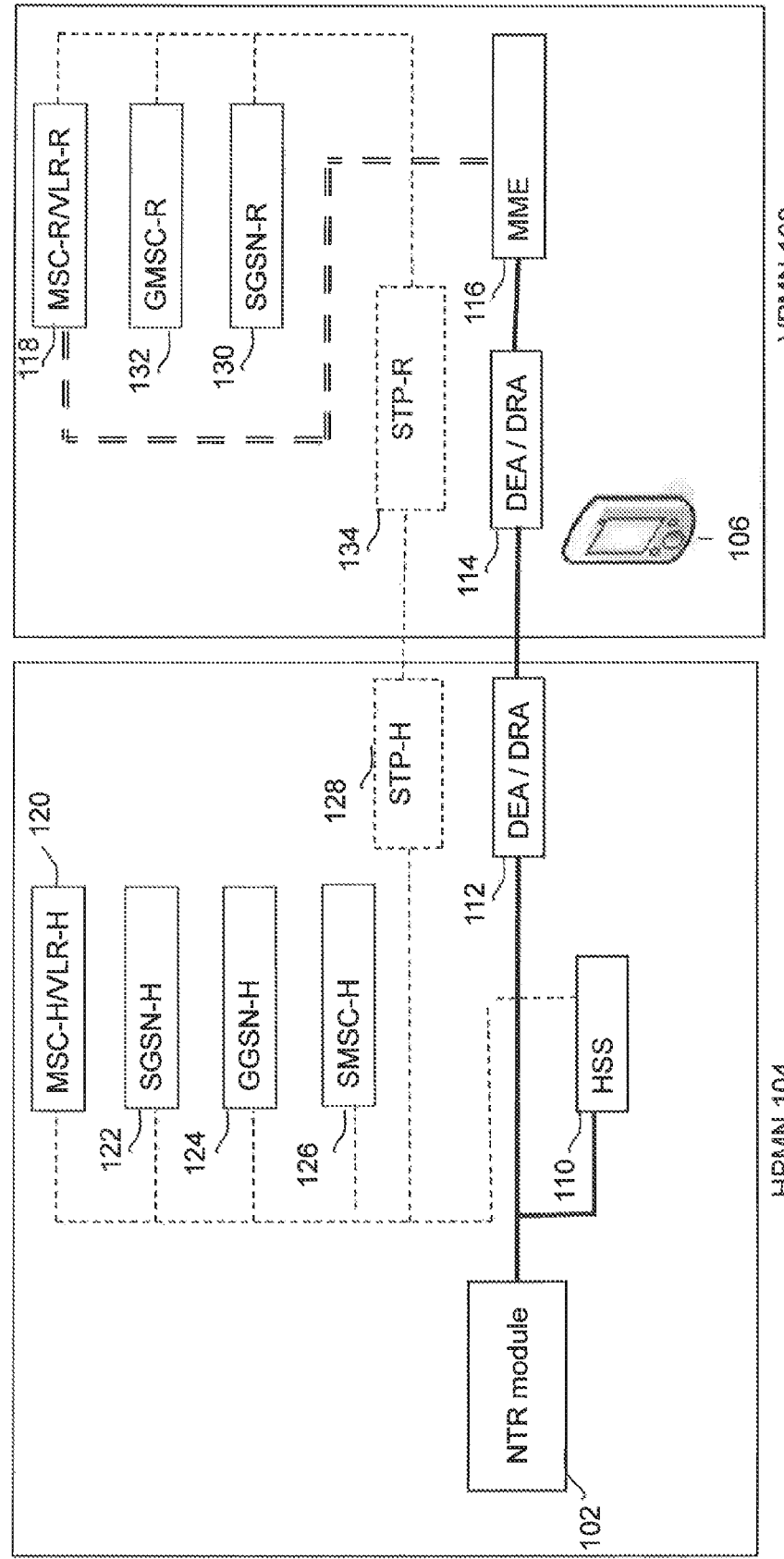
FIG. 1 illustrates a system for implementing the NTR in LTE solution, in accordance with an embodiment of the present invention.

In accordance with another embodiment of the present invention, a group of operators may deploy the NTR solution to steer their subscribers to a set of preferred operators. In such an embodiment, the NTR module is deployed at a centralized location that is connected to a host network. In its various implementation of the present invention, the NTR solution is implemented in monitoring mode or in-signaling mode FIG. 1 illustrates a system 100 that implements the NTR in LTE solution, in accordance with an embodiment of the present invention. NTR module 102 is deployed in HPMN 104 to apply traffic steering on its subscriber 106, who is roaming in a VPMN 108. This enables the operator in HPMN to be able to steer its subscribers to preferred operators in VPMN 108. For sake of representation, system 100 represents network elements from both LTE and GSM networks. HPMN 104 includes an HSS 110 that connects via a DEA/DRA 112 in HPMN 104 and a DEA/DRA 114 in VPMN 108 to an MME 116 in VPMN 108. The MME 116 is further connected to an MSC-R/VLR-R 118 in VPMN 108 via BSSAP+ protocol.

HPMN 105 further includes an MSC-H/VLR-H 120, an SGSN-H 122, a GGSN-H 124, an SMSC-H 126 and an STP-H 128. These network elements communicate with each other over a Signaling System 7 (SS7) link. System 100 further includes in VPMN 108 an SGSN-R 130, a GMSC-R 132, and an STP-R 134 that connects to STP-H 128 over SS7 link.

It will also be apparent to a person skilled in the art that HPMN 104 and VPMN 108 may also include various other network components (not shown in FIG. 1), depending on the architecture under consideration.

NTR module 102 connects with various components within HPMN 104 and VPMN 108 to implement the NTR solution for its roaming subscriber, like roamer 106. The primary objective of NTR module 102 is to be able to do SoR across multiple telecommunication networks like LTE and GSM.

Figure 2:
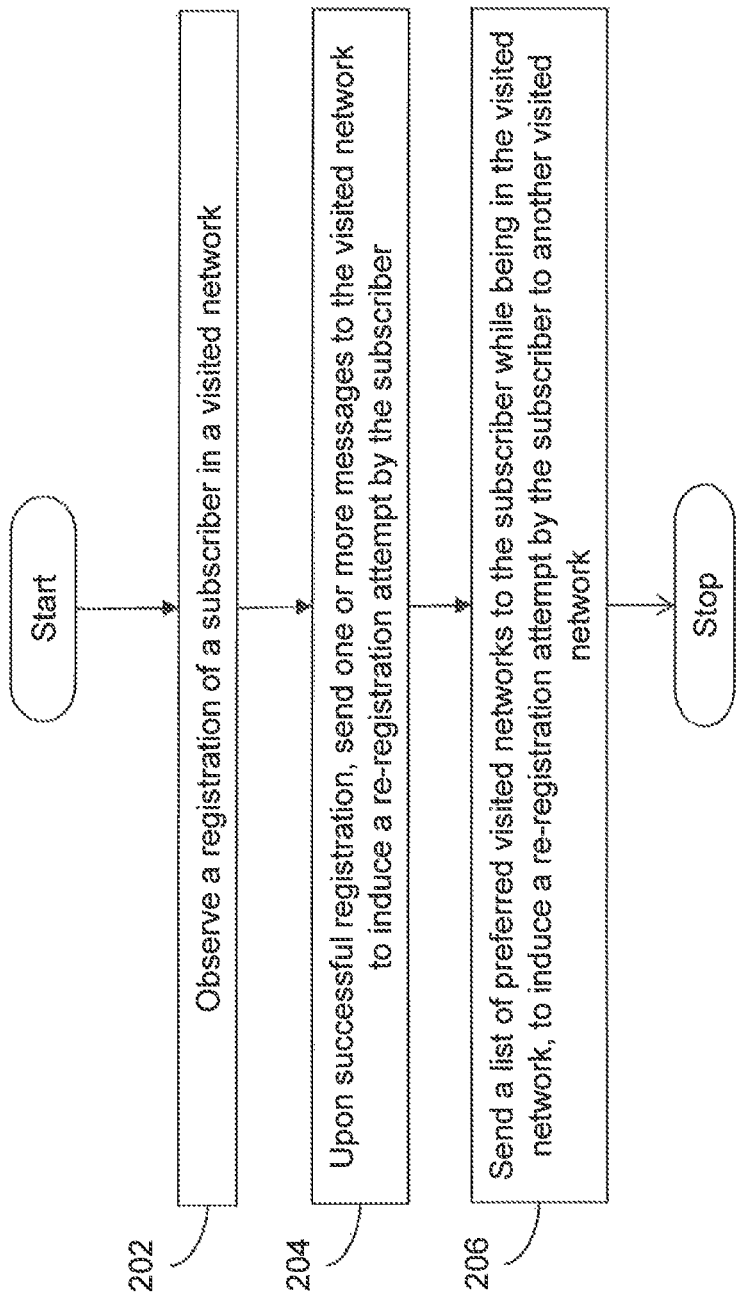
FIG. 2 represents a flowchart for redirecting roaming network traffic in a telecommunication network, in accordance with an embodiment of the present invention.

FIG. 2 represents a flowchart for redirecting roaming network traffic in a telecommunication network, in accordance with an embodiment of the present invention. It will be apparent to a person skilled in the art that various steps of the flowchart would be executed by the NTR module 102. At step 202, a registration of a subscriber in a visited network is observed. In an embodiment of the invention, NTR module 102 observes the registration of roamer 106 in VPMN 108. Thereafter, once the registration is successful, at step 204, the NTR module 102 sends one or more messages to VPMN 108 to induce a re-registration attempt by roamer 106. In one embodiment of the present invention, roamer 106 registers to an LTE network and the messages are Diameter messages. In one embodiment of the present invention, NTR module 102 sends these messages, while being deployed in monitoring mode. In another embodiment of the present invention, NTR module 102 sends these messages, while being deployed in in-signaling mode. In another embodiment of the present invention, at step 206, NTR module 102 sends a list of preferred visited networks to the roamer 106 while being in VPMN 108 to induce a re-registration attempt by the roamer 106 to another visited network. These messages are sent directly to roamer 106's SIM card.

Figure 3:
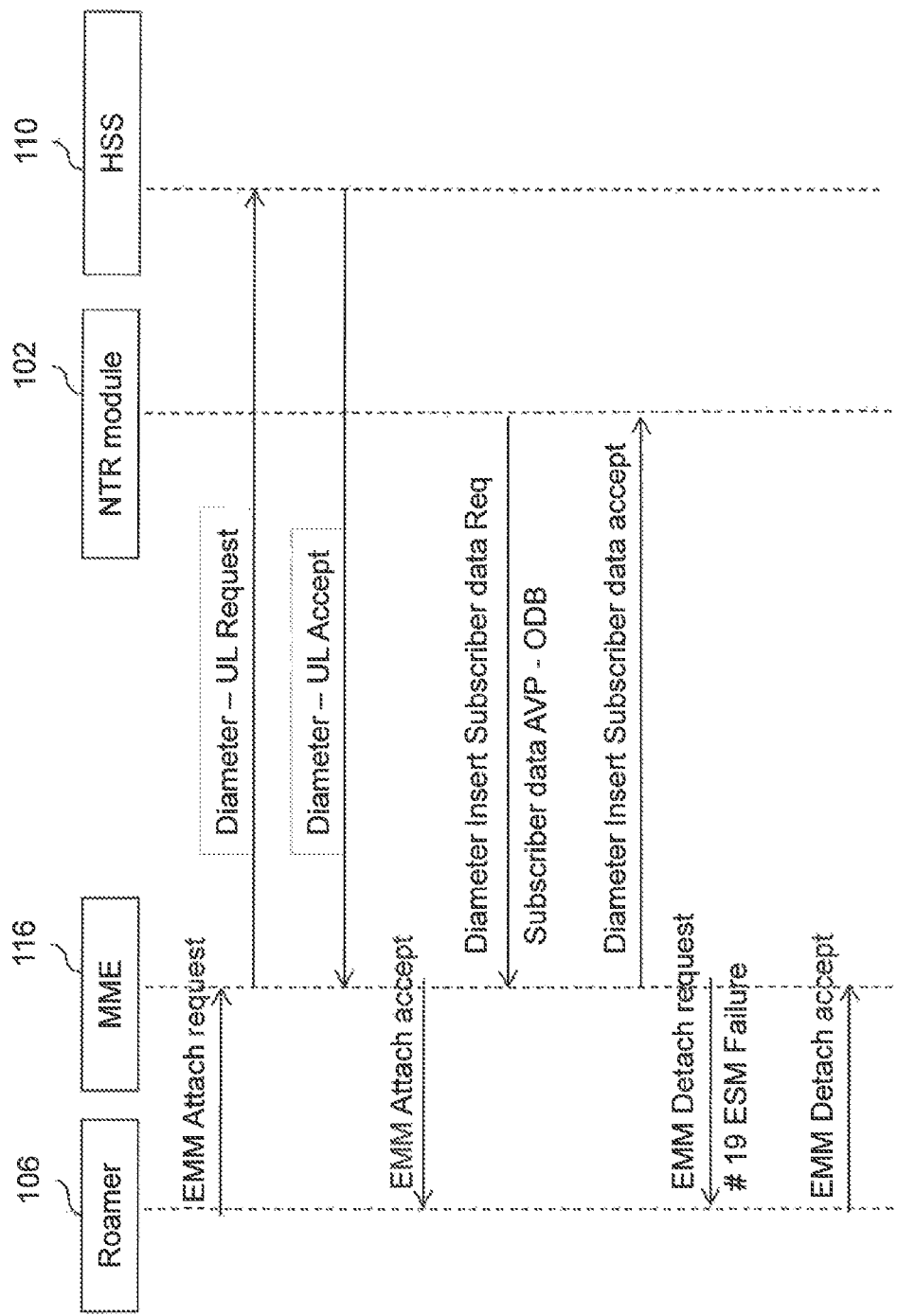
FIG. 3 represents a flow diagram for implementing NTR solution in monitoring mode using an ISD message, in accordance with an embodiment of the present invention.

FIG. 3 represents a flow diagram for implementing NTR solution in monitoring mode using an ISD message, in accordance with an embodiment of the present invention. In order to initiate registration to VPMN 108, roamer 106 sends an EMM Attach request to MME 116 in VPMN 108. MME 116 further sends a Diameter—Update Location Request towards HSS 110 of HPMN 104. In response, HSS 110 sends a Diameter—Update Location Accept to MME 116. Thereafter, MME 116 confirms the registration roamer 106 by sending EMM Attach accept message to roamer 106. Now, when roamer 106 is successfully registered in VPMN 108, NTR module 102 attempts SoR to redirect the roamer 106 to another preferred LTE operator.

Therefore, NTR module 102 sends a Diameter ISD request to MME 116, with ODB as the parameter. The MME 116 acknowledges the message and returns Diameter ISD accept to NTR module 102. Thereafter, MME 116 sends a EMM Detach request with an error code #19 for ESM failure. The roamer 106 acknowledges and sends EMM Detach accept message to MME 116. Hence, the roamer 106 is successfully steered away from VPMN 108.

Figure 4:
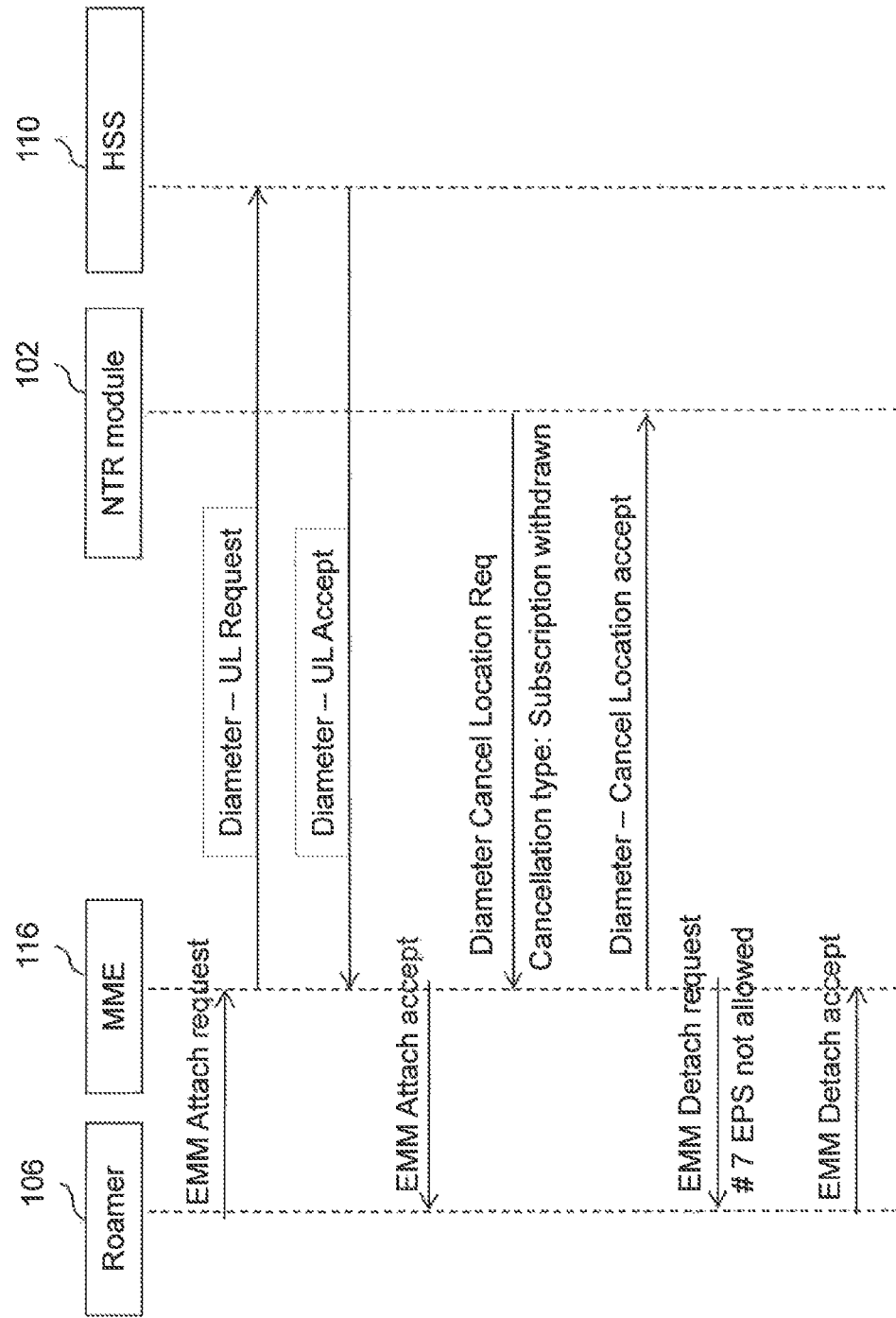
FIG. 4 represents a flow diagram for implementing NTR solution in monitoring mode using a Cancel Location message, in accordance with an embodiment of the present invention.

FIG. 4 represents a flow diagram for implementing NTR solution in monitoring mode using a Cancel Location message, in accordance with an embodiment of the present invention. The call flow for this embodiment, is identical to FIG. 3 embodiment, except that NTR module 102 sends a Diameter Cancel Location Request to MME 116 with cancellation type as subscription withdrawn to force the roamer 106 to steer away from VPMN 106. Also, in this case when MME 116 sends an EMM Detach request it sends with an error code #7 for EPS not allowed.

Figure 5:
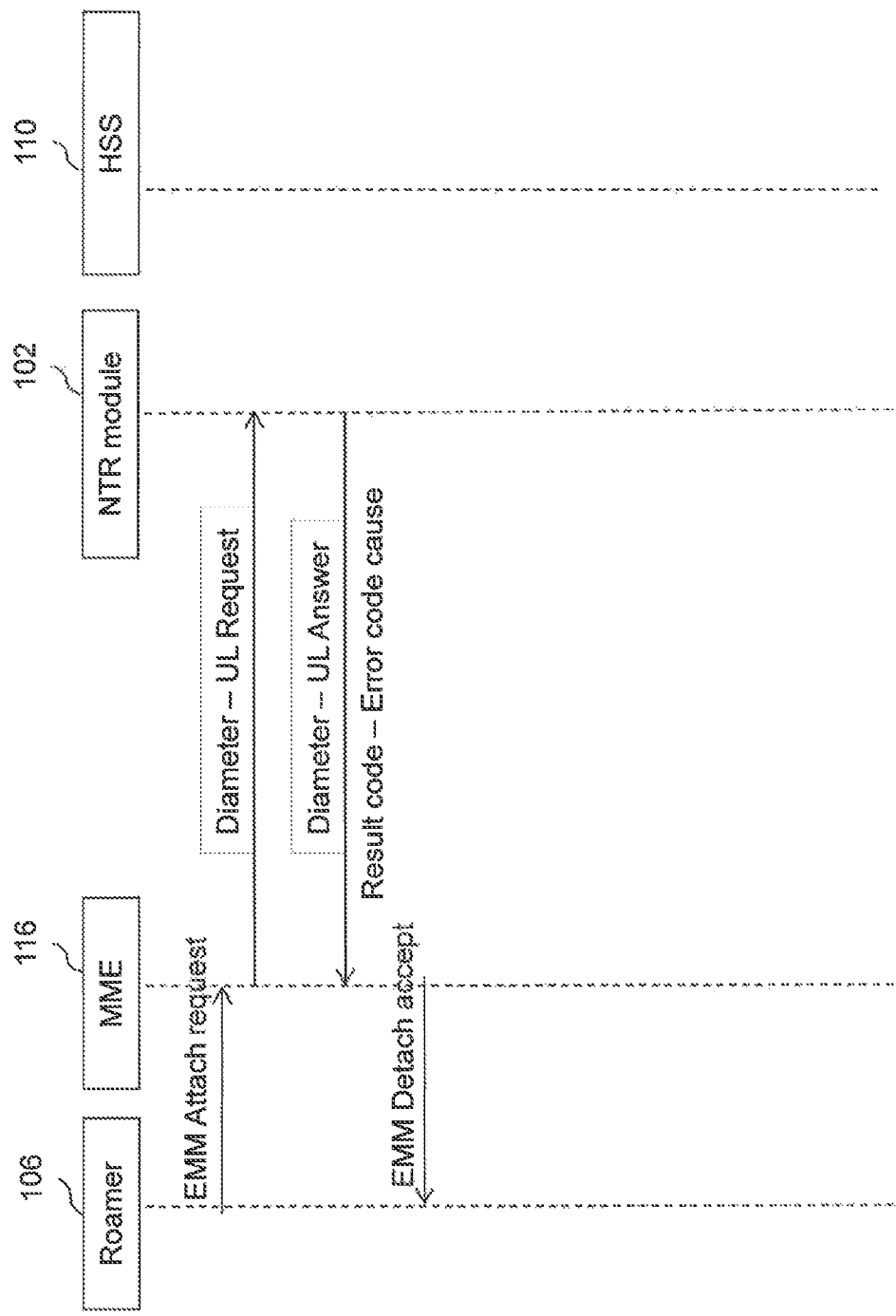
FIG. 5 represents a flow diagram for implementing NTR solution in an in-path mode, in accordance with an embodiment of the present invention.

As mentioned above, the NTR solution can be deployed both in monitoring and in-path mode. FIG. 5 represents a flow diagram for implementing NTR solution in an in-path mode, in accordance with an embodiment of the present invention. In this case, when roamer 106 sends the EMM Attach request to MME 116 and subsequently the MME 116

Cause #11 (PMN Not Allowed)
It forces the mobile UE (User Equipment) to perform a PMN reselection. The mobile UE shall store the PMN identity in the "forbidden PMN list" in the card and the UE shall no more reselect this PMN.

Cause #17 (Network Failure)—leading to additional registration re-attempts (up to 5 attempts) from the mobile before changing network.

Since the NTR solution intercepts the DIAMETER Update Location Request, it can respond with the correct Diameter Update Location Answer (Reject) leading to the expected radio error code and handset behavior.

The mapping table to be applied is as follows:

| Diameter Reject Cause | Radio Error cause |
|---|---|
| DIAMETER_ERROR_UNKNOWN_EPS_SUBSCRIPTION | #15 "No suitable cells in tracking area" |
| DIAMETER_AUTHORIZATION_REJECTED (5003) | #15 "No suitable cells in tracking area" |
| DIAMETER_ERROR_RAT_NOT_ALLOWED (5421) | #15 "No suitable cells in tracking area", or #13 "Roaming not allowed in this tracking area", or #12 "Tracking area not allowed" Note - the cause selection is an operator's choice |
| DIAMETER_ERROR_ROAMING_NOT_ALLOWED (5004) | #11 "PLMN not allowed" |
| DIAMETER_UNABLE_TO_COMPLY (5012), DIAMETER_INVALID_AVP_VALUE (5004) | #17 "Network failure" |
| DIAMETER - Roaming restricted in MME due to unsupported feature, in of the Subscription-Data, part of the Update Location Answer | #14 "EPS services not allowed in this PLMN" |
| OPERATOR_DETERMINED_BARRING is received in the Subscriber-Status AVP, part of the Update Location Answer | #19 "ESM failure" | sends a Diameter UL request, this message is received by NTR module 102 as it is deployed in signaling path. Now, in order to apply SoR, NTR module 102 sends a Diameter UL Answer (Reject) that results in an error code.

The Diameter LTE steering enables to control the radio access technology. In other words, it enables the deploying operator of favoring preferred partner or controlling the traffic distribution between networks but also between Radio Access Technologies (RAT).

The rejection of the Diameter Registration procedures results in various error codes in the radio interface of the mobile of roamer 106. In accordance with various embodiments of the present invention, the NTR module 102 is able to induce the following new error codes on the radio interfaces:
1. Cause #15 (no suitable cells in Tracking Area), #12 "tracking area not allowed", #13 "roaming not allowed in this tracking area and it forces the UE to reselect another RAT in the same PMN. The location area is added to the list of "forbidden LAs for roaming" which is stored in the mobile.
2. Cause #14 "EPS services not allowed in this PLMN" is received by the UE, the chosen PLMN identity shall be stored in the "forbidden PLMNs for GPRS service".
3. Cause #19, "ESM failure", the UE may set the attach attempt counter to 5 and directly attempt to register on another network.

The NTR module 102 also follows the usual rejection principles available in SS7 steering. For example, In yet another embodiment of the present invention, the NTR module 102 performs OTA based steering in LTE environment. There are some mobile devices which do not maintain an SMS stack in LTE networks. Hence, they need an applet to open an IP channel for specific events. For example, the SIM card in the handset may detect the entry in a new PMN or handset may restart. In such a scenario, the SIM card may open an IP channel with OTA server. The OTA server may then request for a dynamic preference list. This request is intercepted by the NTR module 102. At this stage, the NTR module 102 sends the list of preferred networks where it wants to steer its subscriber. Upon receiving the list, the OTA server sends relevant EF files to the handset.

In accordance with various other embodiment of the present invention, the NTR module 102 is also able to redirect network traffic across multiple networks from different RAT. E.g. NTR solution can steer a roamer from LTE to GSM or vice versa.

In the context of coexistence of LTE with pre-LTE technology, the mobility management of outbound roamers may happen in different fashions, from a core network perspective:
EPS only registration i.e. the registration is entirely happening between the MME and HSS.
EPS and non-EPS registration for CSFB and/or Single Radio Voice Call Continuity (SRVCC) i.e. the registration happens between the MME-HSS and MSC/VLR-HLR.

non-EPS registration i.e. the registration happens between the MSC/VLR-HLR and the SGSN-HLR.

It should be noted that while CSFB makes the call happen on the CS-domain, an advantage of the SRVCC is to provide the possibility of a Voice over LTE to fall back to 2G/3G without disruption to the CS-domain, or loss of conversation, in case of an LTE loss of radio coverage. One challenge of the previous steering solution is to identify the current registration status of the subscriber. In other words, the NTR solution determines whether the subscriber is attached to an E-UTRAN or UTRAN/GERAN network access.

This information is required to correctly apply the rejection principles linked to the observed GSM UL. In some cases, GSM UL may happen for combined EPS/Non-EPS registration but also as a standalone scenario, in case of MO/MT call occurring under a new coverage area. It is therefore required to identify in the scenario of the subscriber as a GSM UL does not provided any information.

In specific scenario of 'Circuit-Switched Fallback' (CSFB), the legacy (GSM) and evolved core network protocol (LTE), MAP and Diameter, respectively coexist. When a registration process including CSFB happens, the order of messages observed at HSS/HLR is fully determined. The GSM UL registration only happens after a successful Diameter UL procedure (ULR/ULA).

In other words, observed messages will follow the sequence:
 1. Diameter ULR
 2. Diameter ULA (assumed successful)
 3. GSM UL
 4. ISD/ISD ACK
 5. GSM UL ACK Now if standard SoR is applied on MAP it would mark the Diameter registration as successful but with failure on non-EPS domain. This would lead to ineffective SoR or new steering attempts but with counter rules associated with the EPS domain and not the GSM domain. This misleads the NTR module that would assume a possible manual registration of the subscriber. The observed behavior will vary on handset type (data- or voice-centric), but would be likely to end up in an ineffective steering of roaming action.

It should be obvious for a person skilled in the art that an independent MAP based NTR platform is likely to interfere with the MAP message as it would be unaware of a previous Diameter registration. This would affect negatively the user experience at a time of a call activity. Hence, the NTR solution of the present invention is enhanced with Diameter-handling capabilities like the NTR solution must have information about the two sets of registration procedures (Diameter and MAP).

In accordance with an embodiment of the present invention, the NTR module 102 in such case performs SoR by first observing a registration process of the subscriber in VPMN 108. Thereafter, the NTR module 102 identifies the subscriber's registration on either an LTE network or a GSM network. In case of registration at GSM network, NTR module 102 further identifies whether the roamer's registration is due to loss of LTE coverage or due to CSFB. If registration is due to loss of LTE coverage, then NTR module 102 sends messages to the MME 116 to induce a re-registration attempt by the subscriber to another visited network.

However, in order to check for above-mentioned conditions, the NTR module gains some knowledge about the registration.

Firstly, the NTR module 102 determines whether roamer 106 is attached to an LTE or pre-LTE network. For this, if NTR module 102 observes Diameter ULR (and the corresponding interface S6a), then it can be deduced that roamer 106 is on LTE network. Similarly, if NTR module 102 observes GPRS UL or a Diameter message on the S6d SGSN-HSS interface, then the roamer 106 is on pre-LTE (or GSM) network.

Secondly, the NTR module 102 identifies whether observed MAP messages are related to CSFB activity (i.e., initial registration or at MO/MT call activity) or a regular registration in a legacy (i.e. 2G/3G) network due to a lack of LTE radio coverage or LTE roaming agreement.

Different approaches may be used for identify these cases—their application will depend on the information found in the MAP/Diameter signaling, which depends on the Release implemented.

A first set of parameter that is maintained by the system:
 A timer (T-ULR) will be started after each allowed Diameter ULR on S6a. The timer is maintained per subscriber.
 A timer (T-GPRS-UL) will be started after each allowed GPRS UL (or Diameter ULR on S6d). The timer is maintained per subscriber.
 A timer (T-GSM-UL) will be started after each allowed GSM UL. The timer is maintained per subscriber.

A second set of information is based on the observation of specific fields in the MAP message e.g. CSMO flag GSM UL, CSMT flag in GSM UL, EPS info in GPRS UL, etc.

A third set of information is based on active subscriber state polling. The NTR solution of the present invention sends MAP PSI message to the last known VLR or Diameter InsertSubscriberData Request (IDR) to the last known MME for determining the current subscriber state.

The NTR solution of the present invention is also able to check content of Cancellation message (Diameter Cancel-Location Request (CLR) or MAP CancelLocation (CL), and more precisely the Cancellation Type.

In case the NTR module finds that roamer is within the LTE network, it then validates via a timing condition or message content whether the registration is expected to be related to a CSFB or an actual loss of coverage.
 If the timer value is below a configurable threshold, it can be expected the GSM UL relates to a CSFB registration.
 If the timer value is above a configuration, it can be expected the GSM UL related to loss of coverage. However, the timing condition may be overruled by specific messaging fields (e.g. CSMO flag) or by implementing a polling mechanism which informs that the subscriber is currently busy in a call or still attached to the EPS domain.

With above intelligence, an operator can deploy the NTR solution in multiple combinations, as shown in the table below.

|  |  | Diameter Module | |
|---|---|---|---|
|  |  | Passive | In-Path |
| MAP | Passive | Yes | Yes |
| Module | In-Path | Yes | Yes |

It will be apparent to a person skilled in the art, that the present invention can also be applied to Code Division Multiple Access (CDMA)/American National Standards Institute #41D (ANSI-41D), and various other technologies such as, but not limited to, VoIP, WiFi, 3GSM and interstandard roaming. In one exemplary case, a CDMA outbound roamer travels with an HPMN CDMA handset. In another exemplary case, the CDMA outbound roamer travels with an HPMN GSM SIM and a GSM handset. In yet another exemplary case, GSM outbound roamer travels with an HPMN CDMA RUIM and a CDMA handset. To support these variations, system 100 will have a separate SS7 and network interfaces, corresponding to both the HPMN and VPMN networks. It will also be apparent to a person skilled in the art that these two interfaces in different directions may not have to be the same technologies. Moreover, there could be multiple types of interface in both directions.

An exemplary list of the mapping between GSM MAP and ANSI-41D is described in the table below as a reference.

| GSM MAP | ANSI-41D |
|---|---|
| Location Update/ISD | REGNOT |
| Cancel Location | REGCAN |
| RegisterSS | FEATUREREQUEST |
| InterrogateSS | FEATUREREQUEST |
| SRI-SM | SMSREQ |
| SRI | LOCATION REQUEST |
| ForwardSMS | SMSDPP |
| ReadyForSMS | SMSNOTIFICATION |
| AlertServiceCenter | SMSNOTIFICATION |
| ReportSMSDelivery | SMDPP |
| ProvideRoamingNumber | ROUTING REQUEST |

The present invention can take the form of an entirely hardware embodiment, an entirely software embodiment, or an embodiment containing both hardware and software elements. In accordance with an embodiment of the present invention, software, including but not limited to, firmware, resident software, and microcode, implements the invention.

Furthermore, the invention can take the form of a computer program product, accessible from a computer-usable or computer-readable medium providing program code for use by, or in connection with, a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W) and Digital Versatile Disk (DVD).

The components of present system described above include any combination of computing components and devices operating together. The components of the present system can also be components or subsystems within a larger computer system or network. The present system components can also be coupled with any number of other components (not shown), such as other buses, controllers, memory devices, and data input/output devices, in any number of combinations. In addition, any number or combination of other processor-based components may be carrying out the functions of the present system.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but may not be limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, it covers all of the following interpretations: any of the items in the list, all of the items in the list and any combination of the items in the list.

The above description of illustrated embodiments of the present system is not intended to be exhaustive or to limit the present system to the precise form disclosed. While specific embodiments of, and examples for, the present system are described herein for illustrative purposes, various equivalent modifications are possible within the scope of the present system, as those skilled in the art will recognize. The teachings of the present system provided herein can be applied to other processing systems and methods. They may not be limited to the systems and methods described above.

The elements and acts of the various embodiments described above can be combined to provide further embodiments. These and other changes can be made in light of the above detailed description.

Other Variations

Provided above for the edification of those of ordinary skill in the art, and not as a limitation on the scope of the invention, are detailed illustrations of a scheme for proactive roaming tests, discoveries of roaming partner services and discoveries of frauds in roaming using simulated roaming traffic. Numerous variations and modifications within the spirit of the present invention will of course occur to those of ordinary skill in the art in view of the embodiments that have been disclosed. For example, the present invention is implemented primarily from the point of view of GSM mobile networks as described in the embodiments. However, the present invention may also be effectively implemented on GPRS, 3G, CDMA, WCDMA, WiMax etc., or any other network of common carrier telecommunications in which end users are normally configured to operate within a "home" network to which they normally subscribe, but have the capability of also operating on other neighboring networks, which may even be across international borders.

The examples under the system of present invention detailed in the illustrative examples contained herein are described using terms and constructs drawn largely from GSM mobile telephony infrastructure. However, use of these examples should not be interpreted as limiting the invention to those media. The system and method can be of use and provided through any type of telecommunications medium, including without limitation: (i) any mobile telephony network including without limitation GSM, 3GSM, 3G, CDMA, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from Dlink; or telecommunications equipment meant for voice over IP communications such as those provided by Vonage or Packet8.

In describing certain embodiments of the system under the present invention, this specification follows the path of a telecommunications call, from a calling party to a called party. For the avoidance of doubt, such a call can be a normal voice call, in which the subscriber telecommunications equipment is also capable of visual, audiovisual or motion-picture display. Alternatively, those devices or calls can be for text, video, pictures or other communicated data.

In the foregoing specification, specific embodiments of the present invention have been described. However, one of ordinary skill in the art will appreciate that various modifications and changes can be made without departing from the scope of the present invention as set forth in the claims below. Accordingly, the specification and the figures are to be regarded in an illustrative rather than a restrictive sense, and all such modifications are intended to be included within the scope of present invention. The benefits, advantages, solutions to problems, and any element(s) that may cause any benefit, advantage, or solution to occur, or to become more pronounced, are not to be construed as a critical, required, or essential feature or element of any or all of the claims.

APPENDIX

| Acronym | Description |
|---|---|
| 3G | Third generation of mobile |
| ACM | ISUP Address Completion Message |
| ANM | ISUP Answer Message |
| ANSI-41 | American National Standards Institute #41 |
| ATI | Any Time Interrogation |
| BCSM | Basic Call State Model |
| BSC | Base Station Controller |
| BOIC | Barring Outgoing International Calls |
| BOIC-EX-Home | Barring Outgoing International Calls except to home country |
| CAMEL | Customized Application for Mobile Enhanced Logic |
| CAP | Camel Application Part |
| CB | Call Barring |
| CC | Country Code |
| CDMA | Code Division Multiplexed Access |
| CdPA | Called Party Address |
| CDR | Call Detail Record |
| CF | Call Forwarding |
| CgPA | Calling Party Address |
| CIC | Circuit Identification Code |
| CLI | Calling Line Identification |
| CSD | Circuit Switched Data |
| CSI | Camel Subscription Information |
| DPC | Destination Point Code |
| DSD | Delete Subscriber Data |
| DEA | Diameter Edge Agent |
| DRA | Diameter Routing Agent |
| DTMF | Dual Tone Multi-Frequency |
| ERB | CAP Event Report Basic call state model |
| EU | European Union |
| FPMN | Friendly Public Mobile Network |
| FTN | Forward-To-Number |
| GLR | Gateway Location Register |
| GGSN | Gateway GPRS Support Node |
| GMSC | Gateway MSC |
| GMSC-F | GMSC in FPMN |
| GMSC-H | GMSC in HPMN |
| GPRS | General Packet Radio System |
| GSM | Global System for Mobile |
| GSMA | GSM Association |
| GSM SSF | GSM Service Switching Function |
| GsmSCF | GSM Service Control Function |
| GT | Global Title |
| GTP | GPRS Tunnel Protocol |
| HLR | Home Location Register |
| HPMN | Home Public Mobile Network |
| IN | Intelligent Network |
| IOT | Inter-Operator Tariff |
| GTT | Global Title Translation |
| IAM | Initial Address Message |
| IDP | Initial DP IN/CAP message |
| IDD | International Direct Dial |
| IMSI | International Mobile Subscriber Identity |
| IMSI-H | HPMN IMSI |
| IN | Intelligent Network |
| INAP | Intelligent Network Application Part |
| INE | Interrogating Network Entity |
| IP | Internet Protocol |
| IREG | International Roaming Expert Group |
| IRS | International Revenue Share |
| ISC | International Service Carrier |
| ISD | MAP Insert Subscriber Data |
| ISG | International Signal Gateway |
| IST | Immediate Service Termination |
| ISTP | International STP |
| ISTP-F | ISTP connected to FPMN STP |
| ISTP-H | ISTP connected to HPMN STP |
| ISUP | ISDN User Part |
| ITPT | Inbound Test Profile Initiation |
| ITR | Inbound Traffic Redirection |
| IVR | Interactive Voice Response |
| LU | Location Update |
| LUP | MAP Location Update |
| MAP | Mobile Application Part |
| MCC | Mobile Country Code |
| MCC | Mobile Country Code |
| MD | Missing Data |
| ME | Mobile Equipment |
| MGT | Mobile Global Title |
| MMS | Multimedia Message Service |
| MMSC | Multimedia Message Service Center |
| MMSC-F | FPMN MMSC |
| MMSC-H | HPMN MMSC |
| MNC | Mobile Network Code |
| MNP | Mobile Number Portability |
| MO | Mobile Originated |
| MOS | Mean Opinion Score |
| MS | Mobile Station |
| MSC | Mobile Switching Center |
| MSISDN | Mobile Station International Subscriber Directory Number |
| MSISDN-F | FPMN MSISDN |
| MSISDN-H | HPMN MSISDN |
| MSRN | Mobile Station Roaming Number |
| MSRN-F | FPMN MSRN |
| MSRN-H | HPMN MSRN |
| MT | Mobile Terminated |
| MTP | Message Transfer Part |
| NDC | National Dialing Code |
| NP | Numbering Plan |
| NPI | Numbering Plan Indicator |
| NRTRDE | Near Real Time Roaming Data Exchange |
| O-CSI | Originating CAMEL Subscription Information |
| OCN | Original Called Number |
| ODB | Operator Determined Barring |
| OPC | Origination Point Code |
| OR | Optimal Routing |
| ORLCF | Optimal Routing for Late Call Forwarding |
| OTA | Over The Air |

APPENDIX-continued

| Acronym | Description |
|---|---|
| OTPI | Outbound Test Profile Initiation |
| PDP | Protocol Data Packet |
| PDN | Packet Data Network |
| PDU | Packet Data Unit |
| PRN | MAP Provide Roaming Number |
| PSI | MAP Provide Subscriber Information |
| QoS | Quality of Service |
| RAEX | Roaming Agreement EXchange |
| RI | Routing Indicator |
| RIS | Roaming Intelligence System |
| RDN | Redirecting Number |
| RNA | Roaming Not Allowed |
| RR | Roaming Restricted due to unsupported feature |
| RRB | CAP Request Report Basic call state model |
| RSD | Restore Data |
| RTP | Real-Time Transport Protocol |
| SAI | Send Authentication Info |
| SC | Short Code |
| SCA | Smart Call Assistant |
| SCCP | Signal Connection Control part |
| SCP | Signaling Control Point |
| SF | System Failure |
| SG | Signaling Gateway |
| SGSN | Serving GPRS Support Node |
| SGSN-F | FPMN SGSN |
| SIM | Subscriber Identity Module |
| SIGTRAN | Signaling Transport Protocol |
| SME | Short Message Entity |
| SM-RP-UI | Short Message Relay Protocol User Information |
| SMS | Short Message Service |
| SMSC | Short Message Service Center |
| SMSC-F | FPMN SMSC |
| SMSC-H | HPMN SMSC |
| SoR | Steering of Roaming |
| SPC | Signal Point Code |
| SRI | MAP Send Routing Information |
| SRI-SM | MAP Send Routing Information For Short Message |
| SS | Supplementary Services |
| SS7 | Signaling System #7 |
| SSN | Sub System Number |
| SSP | Service Switch Point |
| STK | SIM Tool Kit Application |
| STP | Signal Transfer Point |
| STP-F | FPMN STP |
| STP-H | HPMN STP |
| TADIG | Transferred Account Data Interchange Group |
| TAP | Transferred Account Procedure |
| TCAP | Transaction Capabilities Application Part |
| VT-CSI | Visited Terminating CAMEL Service Information |
| TP | SMS Transport Protocol |
| TR | Traffic Redirection |
| TS | Traffic Steering |
| TT | Translation Type |
| UD | User Data |
| UDH | User Data Header |
| UDHI | User Data Header Indicator |
| USSD | Unstructured Supplementary Service Data |
| VAS | Value Added Service |
| VIP | Very Important Person |
| VLR | Visited Location Register |
| VLR-F | FPMN VLR |
| VLR-H | HPMN VLR |
| VLR-V | VPMN VLR |
| VMSC | Visited Mobile Switching Center |
| VoIP | Voice over IP |
| VPMN | Visited Public Mobile Network |
| ATI | Access Transport Information |
| UDV | Unexpected Data Value |
| USI | User Service Information |
| WAP | Wireless Access Protocol |

| Technical references | |
|---|---|
| Between AS and HSS | 3GGP TS 29.328 & TS 29.329 |
| Between AS and SLF | 3GGP TS 29.328 & TS 29.329 |
| Between AS and OFCS | RFC 4006, 3GGP TS 32.225 & TS 32.299 |
| Between AS and OCS | RFC 4006, 3GGP TS 32.225 & TS 32.299 |
| Between OCF and Rating function | 3GPP TS 32.296 |
| Between CSCF and HSS | 3GPP TS 29.228 & TS29.229 |
| Between CSCF and SLF | 3GPP TS 29.228 & TS29.229 |
| Between PCRF and SPR | 3GPP TS 23.203, TS 29.328 & TS 29.329 |
| Between AF and the PCRF | 3GPP TS 23.203 & TS 29.214 |
| Rx reference point for EPC | 3GPP TS 32820, 3GPP TS 23.203 & TS 29.214 |
| Between PCEF and the PCRF | 3GPP TS 29.212 & TS 23.203 |
| Between OCS and PCEF | 3GPP TS 32.29, TS 32.251 & RFC 4006 |
| Between PCEF and OFCS | 3GPP TS 32.240, TS 32.295 |
| Between AF and PDF | 3GPP TS 29.209 |
| Between Packet Domain and an external packet data network | 3GPP TS 29.061 |
| between the EPC based PLMN and the packet data network | 3GPP TS 29.061 |
| Between BSF and HSS | 3GPP TS 29.109 & TS 33.220 |
| Between BSF and SLF | 3GPP TS 29.109 & TS 33.220 |
| Between BSF and NAF | 3GPP TS 29.109 & TS 33.220 |
| Between BSF and Zn Proxy | 3GPP TS 29.109 & TS 33.220 |
| Between the 3GPP AAA Server and an SLF | 3GPP TS 29.234 |
| Between the WLAN AN and the 3GPP AAA Proxy | 3GPP TS 29.234 |
| Between the 3GPP AAA Proxy and 3GPP AAA Server | 3GPP TS 29.234 |
| Between the 3GPP AAA Server and the HSS | 3GPP TS 29.234 |
| Between the 3GPP AAA Server and the PDG | 3GPP TS 29.234 |
| Between the 3GPP AAA Server/Proxy and the WAG | 3GPP TS 29.234 |
| Between the 3GPP AAA Server and the PNA | 3GPP TS 29.234 |
| Between the 3GPP AAA Server and the PDG | 3GPP TS 29.234 |
| Between GGSN and BM-SC | 3GPP TS 29.061 |
| Mz is the roaming variant of the Gmb reference point with the same functionality | 3GPP TS 29.061 |
| CCF to BS | 3GPP TS TS 32.225 |
| Multimedia Messaging Service (MMS) | OMA MM10 interface |
| Between AGW and PCRF | 3GPP2 TSG-X X.S0013-014 |
| Between AF and PCRF | 3GPP2 TSG-X X.S0013-013 |
| Between MME and HSS | 3GPP TS 29.272 |
| Between the 3GPP AAA Server/Proxy and the PDN GW | 3GPP TS 23402 |
| Between MME and HSS | 3GPP TS 29.272 |
| Transfer of (QoS) policy information from PCRF to the S-GW. | 3GPP TS 32820, TS 23402 |
| Between PCRF in the HPLMN (H PCRF) and a PCRF in the VPLMN (V PCRF) | 3GPP TS 23.203 & TS 29.215 |
| Between MME and EIR | 3GPP TS 29.272 |
| PCRF and the BBERF | 3GPP TS 23.203 |
| Between ePDG and vPCRF | 3GPP TS 23.203 |
| PCRF and the BBERF | 3GPP TS 23.203 |
| Between an un-trusted non-3GPP IP access and the 3GPP AAA Server/Proxy | 3GPP TS 23402 |
| Between the 3GPP AAA Proxy and 3GPP AAA Server | 3GPP TS 23402 |
| Between Untrusted Non-3GPP IP Access and ePDG | 3GPP TS 23402 |
| Between the 3GPP AAA Server/Proxy and the ePDG | 3GPP TS 23402 |

-continued

| Technical references | |
|---|---|
| Between the 3GPP AAA Server and the HSS | 3GPP TS 23402 |
| Between a trusted non-3GPP IP access and the 3GPP AAA Server/Proxy | 3GPP TS 23402 |
| Between the 3GPP AAA Server and the HA | 3GPP TS 23402 |

We claim:

1. A method for redirecting roaming network traffic in one or more telecommunication networks, the method comprising:
    observing, by a module deployed in a home network, a registration process of a subscriber in a first visited network, the registration process including transmission of a Diameter Update Location Request message by the first visited network to the home network and transmission of a Diameter Update Location Update message by the home network to the first visited network;
    identifying, by the module deployed in the home network, whether the subscriber is registered on a Long Term Evolution (LTE) network or a Global System for Mobile communications (GSM) network;
    if the subscriber is registered on the LTE network, attempting to redirect the subscriber to a different LTE network;
    if the subscriber is registered on the GSM network, then determining whether the registration of the subscriber is due to loss of LTE coverage or circuit-switched fallback (CSFB);
    if the registration of the subscriber is due to CSFB, then allowing the subscriber to be registered on the GSM network; and
    if the registration of the subscriber is due to the loss of LTE coverage, then sending, by the module deployed in the home network, one or more messages to the first visited network that includes a request with an operator determined barring (ODB) parameter that induces the first visited network to send a detach request to the subscriber to detach from the first visited network and attempt a registration with a second visited network.

2. The method of claim 1, wherein the one or more messages are one of Diameter InsertSubscriberData Request (IDR) message or Diameter CancelLocation Request (CLR) message.

3. The method of claim 1, wherein sending one or more messages further comprises sending a list of preferred visited networks to the subscriber while being in the first visited network, to induce the re-registration attempt by the subscriber to the second visited network.

4. The method of claim 3, wherein the list of preferred visited networks is sent in response to an applet on subscriber's handset being able to detect one of roaming, network registration change, handset start, or activation timer, and opening a communication channel to get the list of networks.

5. The method of claim 1, wherein the registration process is executed between a Mobility Management Entity (MME) in the first visited network and a home subscriber server (HSS) of the home network of the subscriber.

6. The method of claim 1, wherein the one or more messages are sent to a Mobility Management Entity (MME) in the first visited network.

7. The method of claim 1, further comprising rejecting the registration of the subscriber in the first visited network when the registration invokes a radio technology change from LTE to GSM.

8. The method of claim 1, wherein the registration of the subscriber is a dual registration for CSFB, over LTE network for data access and GSM network for voice access.

9. The method of claim 1, further comprising discriminating between a dual registration or a consecutive registration of the subscriber, by analyzing a signaling pattern of the registration process.

10. A system for redirecting roaming network traffic in a telecommunication network, the system comprising:
    a network traffic redirection (NTR) module deployed in a home network, the NTR module configured to:
        observe a registration process of a subscriber in a first visited network, wherein the registration process includes transmission of a Diameter Update Location Request message by the first visited network to a home network and transmission of a Diameter Update Location Accept message by the home network to the first visited network;
        identify whether the subscriber is registered on a Long Term Evolution (LTE) network or a Global System for Mobile communications (GSM) network;
        if the subscriber is registered on the LTE network, attempt to redirect the subscriber to a different LTE network;
        if the subscriber is registered on the GSM network, determine whether the registration of the subscriber is due to loss of LTE coverage or circuit-switched fallback (CSFB);
        if the registration of the subscriber is due to CSFB, allow the subscriber to be registered on the GSM network; and
        upon observing that the subscriber is successfully registered in the first visited network, send one or more messages to the first visited network that includes a request with an operator determined barring (ODB) parameter that induces the first visited network to send a detach request to the subscriber to detach from the first visited network and attempt a registration with a second visited network.

11. The system of claim 10, wherein the NTR module is configured to send one of Diameter InsertSubscriberData Request (IDR) message or Diameter CancelLocation Request (CLR) message.

12. The system of claim 10, wherein the NTR module is configured to send a list of preferred visited networks to the subscriber while being in the first visited network, to induce the re-registration attempt by the subscriber to the second visited network.

13. The system of claim 10, wherein the NTR module is further configured to:
    identify whether the subscriber registered on a Long Term Evolution (LTE) network or a Global System for Mobile communications (GSM) network;
    if the subscriber registered on the GSM network, then the NTR module is configured to determine whether the registration of the subscriber is due to loss of LTE coverage or circuit-switched fallback (CSFB); and
    if the registration of the subscriber is due to the loss of LTE coverage, then the NTR module is configured to send the one or more messages to the first visited network to induce the re-registration attempt by the subscriber to the second visited network.

14. The system of claim 10, wherein the registration process is executed between a Mobility Management Entity (MME) in the visited network and a home subscriber server (HSS) of the home network of the subscriber.

15. The system of claim 10, wherein the NTR module is configured to send the one or more messages to a Mobility Management Entity (MME) corresponding to the first visited network.

16. The system of claim 10, wherein the NTR module is configured to reject the registration of the subscriber in the first visited network when the registration invokes a radio technology change from Long Term Evolution (LTE) to Global System for Mobile communications (GSM).

* * * * *